United States Patent [19]

Yamamoto et al.

[11] Patent Number: 5,050,106
[45] Date of Patent: Sep. 17, 1991

[54] ARTICLE RECOGNIZING SYSTEM

[75] Inventors: Saburo Yamamoto, Takatsuki; Kimio Igarashi, Gosen, both of Japan

[73] Assignee: Omron Tateisi Electronics Co., Kyoto, Japan

[21] Appl. No.: 579,093

[22] Filed: Sep. 6, 1990

Related U.S. Application Data

[63] Continuation of Ser. No. 251,523, Sep. 30, 1988, abandoned.

[30] Foreign Application Priority Data

Oct. 7, 1987 [JP] Japan ............................ 62-253060
Oct. 8, 1987 [JP] Japan ............................ 62-255349
Oct. 8, 1987 [JP] Japan ............................ 62-255350

[51] Int. Cl.$^5$ ............................................. G06F 15/46
[52] U.S. Cl. ................................. 364/550; 364/552; 364/506; 364/474.17; 364/474.37; 340/825.23; 382/25
[58] Field of Search ............... 364/550, 506, 507, 552, 364/556, 474.02, 474.11, 474.16, 474.17, 474.21, 474.37; 340/825.06, 825.1, 825.13, 825.22, 825.23; 382/10, 16, 25

[56] References Cited

U.S. PATENT DOCUMENTS

| 4,611,156 | 9/1986 | Feichtinger | 364/474.37 |
| 4,634,849 | 1/1987 | Klingen | 235/487 |
| 4,672,306 | 6/1987 | Thong | 364/550 |
| 4,697,245 | 9/1987 | Kara et al. | 364/552 |
| 4,742,470 | 5/1988 | Juengel | 364/474.17 |

FOREIGN PATENT DOCUMENTS 3523554 3/1986 Fed. Rep. of Germany .
3706114 8/1987 Fed. Rep. of Germany .

Primary Examiner—Parshotam S. Lall
Assistant Examiner—Brian M. Mattson
Attorney, Agent, or Firm—Foley & Lardner

[57] ABSTRACT

An ID unit storing ID data of an article is attached to the article to be recognized. A write/read control unit writes or reads predetermined data in a contactless manner into/from the ID unit through a head. A monitor unit can be attachably and detachably connected to the write/read control unit. The monitor unit has a mode setting device, a key input apparatus, and a display device. When the RUN mode is set, the control unit performs the writing/reading operations for the ID unit under control of an upper control apparatus. When the MONITOR mode is set, the control unit performs the writing/reading operations for the ID unit in response to an input command from the key input apparatus of the monitor unit. When the TEST mode is set, the writing/reading operations are continously executed and a check is made to see if each of the writing/reading operations has correctly been executed or not, and the result of the discrimination is displayed on the display device of the monitor unit.

7 Claims, 7 Drawing Sheets

ARTICLE RECOGNIZING SYSTEM

This application is a continuation of application Ser. No. 07/251,523, filed Sept. 30, 1988 now abandoned.

BACKGROUND OF THE INVENTION

1. Field of the Invention

The present invention relates to an article recognizing system which is used to automatically manage and exchange tools of a machine tool, to manage parts and products in a factory, to identify articles in a physical distribution system and the like.

2. Description of Prior Art

In general, in order to mechanize the automatic exchange or management of tools of a machine tool, discrimination of parts and products on an assembly conveying line in a factory, or the like, a system to recognize and manage the articles such as tools, parts, products and the like is necessary. To satisfy this demand, an article recognizing system has recently been developed. This system comprises a write/read control unit and a head connected thereto. The write/read control unit is connected to an upper (superior or host) control apparatus including computer system. On the other hand, an ID unit having therein a non-volatile memory to store ID data or the like of an article is attached to the articles which are sent on, e.g. a conveying line. When an article arrives at the position of the head, data is written into or read out from the ID unit by the head in a contactless manner under control of the write/read control unit in response to a command from the upper control apparatus.

Since the data transmission and reception are executed between the head of the write/read control unit and the ID unit in a contactless manner, if the distance between the head and the ID unit is improper, such a situation that data cannot be accurately written or read out may occur. Therefore, upon istallation, the adjustment of the distance between the head and the ID unit and the positioning thereof become important, and the severe adjusting work is required. On the other hand, after the positioning adjustment has once been performed, there occurs a case where the distance at which data can be stably written or read out changes due to the noises, circumstances or the like, so that a readjustment is required.

However, the conventional article recognizing system does not have a stable operation indicator to indicate that the data writing/reading operations can be correctly performed. Therefore, it is difficult to stably confirm the writing/reading operating range. Further, since the writing/reading operations for the ID unit are executed in response to a command from the upper control apparatus, upon adjustment in a field where the head is installed, the worker must go to the location where the upper control apparatus is installed and which is away from this field to operate the upper control apparatus. Thus, there are problems such that the adjusting work is difficult and it takes time. In addition, the write/read data cannot be checked or corrected in the field where the head is located.

In the article recognizing system, a plurality of write/read control units to be installed in the field are generally connected to one upper control apparatus.

The upper control apparatus is connected to a plurality of control units through transmission lines and gives write/read commands and the like to each of the write/read control units together with the unit number assigned thereto. If the command given from the upper control apparatus includes the self No., the write/read control unit recognizes this command and performs the data transmission and reception with the ID unit in accordance with this command.

The write/read control unit returns a response indicating that the command was correctly executed to the upper control apparatus together with the self No. after completion of the writing/reading operations. On the contrary, when the command could not be correctly finished, the write/read control unit returns an error code response indicative of the kind of error occurred to the upper control apparatus together with the self No. When the error code responses are returned, the upper control apparatus stores the error code data for every write/read control unit and manages the errors.

In such a conventional system, the error data generated are managed in a lump by the upper control apparatus. Therefore, when a plurality of write/read control units are connected to the upper control apparatus, there is a problem such that the load of the upper control apparatus increases to manage the errors generated.

SUMMARY OF THE INVENTION

The present invention is made in consideration of the foregoing problem, and it is an object of the invention to provide an article recognizing system for writing/reading data on the basis of commands from an upper (superior or host) control apparatus, in which the writing/reading operations for an ID unit can be also executed on the basis of commands from write/read control units.

Another object of the invention is to provide an article recognizing system for writing/reading data on the basis of commands from an upper control apparatus, in which the writing/reading operations for an ID unit can be also executed based on commands from write/read control units and can be also continuously performed in a predetermined operating mode.

Still another object of the invention is to provide an article recognizing system in which the load of an upper control apparatus is reduced and error data can be also monitored by each write/read control unit as necessary.

According to the present invention, there is provided an article recognizing system comprising a head to perform data transmission and reception in a contactless manner for an ID unit storing ID data of an article, and a write/read control unit to control the data transmission and reception through the head in accordance with commands from an upper control apparatus, wherein the write/read control unit is provided with a monitor unit having a mode setting device to select either the first mode or the second mode, key input means for inputting the commands relating to the data transmission and reception for the ID unit and a display device. When the first mode is selected, the write/read control unit is made operative on the basis of the command from the upper control apparatus, and when the second mode is selected, the write/read control unit is made operative on the basis of the key input from the monitor unit.

In this article recognizing system, when the second mode is selected by the mode setting device in the monitor unit, a write or read command is input to the write/read control unit by the operation of the key input means in the monitor unit. Thus, data is written into or read out from the ID unit, and the result is displayed on the display device in the monitor unit.

According to the invention, the monitor unit has a mode setting device to select either the first mode (RUN mode) or the second mode (MONITOR mode), a key input means for inputting commands relating to the data transmission and reception for the ID unit, and a display device is provided for the write/read control unit. Therefore, even if the write/read control unit is disconnected from the upper control apparatus, the write/read control unit can write/read data into/from the ID unit. In the field where the head and write/read control unit are installed and which is remote from the upper control apparatus, the adjustment of the distance between the head and an object and the check of the write/read data can be easily performed.

According to the invention, there is provided an article recognizing system comprising a head to perform data transmission and reception in a contactless manner for an ID unit storing ID data of an article, and a write/read control unit to control the data transmission and reception through the head in accordance with commands from an upper control apparatus, wherein the write/read control unit is provided with a monitor unit having means for designating a test mode, key input means for inputting commands relating to the data transmission and reception for the ID unit, and a display device, and the write/read control unit comprises means for receiving a key input signal from the monitor unit, means for continuously executing the writing/reading operations for the ID unit in response to the designation of the test mode, and means for discriminating whether each of the writing and reading operations has correctly been performed and for displaying the result of the discrimination on the display device of the monitor unit.

In this article recognizing system, when the test mode is designated in the monitor unit, the writing and reading processes are continuously executed after that. A check is made to see if each of the writing and reading operations has correctly been performed, and the result is displayed on the display device of the monitor unit. Therefore, it is possible to check whether each of the writing/reading operations has correctly been performed at every distance in the test mode designated while making the ID unit approach or be away from the head, that is, while adjusting the distance between the ID unit and the head. The distance of the ID unit to the head can be easily adjusted, thereby enabling the ID unit to be set to the proper distance.

According to the invention, there is provided an article recognizing system comprising a head to perform the data transmission and reception in a contactless manner for an ID unit storing ID data of an article, and a write/read control unit to control the data transmission and reception through the head in accordance with commands from an upper control apparatus, wherein the write/read control unit has means for discriminating whether errors have occurred at the data transmission and reception, and error data memory means for sequentially storing the errors discriminated by the discriminating means by every kind of error. Preferably, the write/read control unit has monitor means for outputting the error data as necessary.

In this article recognizing system, when a command is input from the upper control apparatus, the writing/reading operation is executed in accordance with this command. The occurrence of errors is discriminated at every completion of the writing/reading operation. If errors occur, they are sequentially stored by every kind of error into the error data memory means. These error data are displayed and output by the monitor means as necessary.

Therefore, even when the upper control apparatus manages a plurality of write/read control units, the error management is executed by each write/read control unit, so that the load of the upper control apparatus is reduced. When a plurality of write/read control units are connected to the upper control apparatus, the informaton indicating in which unit in the system and what kind of error occurred can be known by monitoring the content stored in the memory means of every unit, so that the maintenance of the system can be easily performed. On the other hand, the cause and frequency of the errors occurred can be monitored in the field where the unit is installed and a countermeasure can be rapidly taken.

DETAILED DESCRIPTION OF THE PREFERRED EMBODIMENT

In the article recognizing system of this embodiment, a write/read control unit 4 writes or reads out data into or from an ID unit 2 attached to an article 1 through a head 5 by the electromagnetic coupling in response to commands from an upper (superior or host) control apparatus 6 including a computer and the like. In this system, a monitor unit 7 is attached to the write/read control unit 4. The monitor unit 7 can select either a RUN mode or a MONITOR mode, as will be explained hereinafter. When the RUN mode is selected, the write/read control unit 4 executes the writing or reading operation of ID data or the like for the ID unit 2 in accordance with a command from the upper control apparatus 6. On the other hand, when the MONITOR mode is selected, the upper control apparatus 6 is electrically disconnected from the write/read control unit 4, and the write/read control unit 4 executes the control of the writing/reading operation or the like of the ID data or the like for the ID unit 2 in response to a command from the monitor unit 7.

Figure 1:
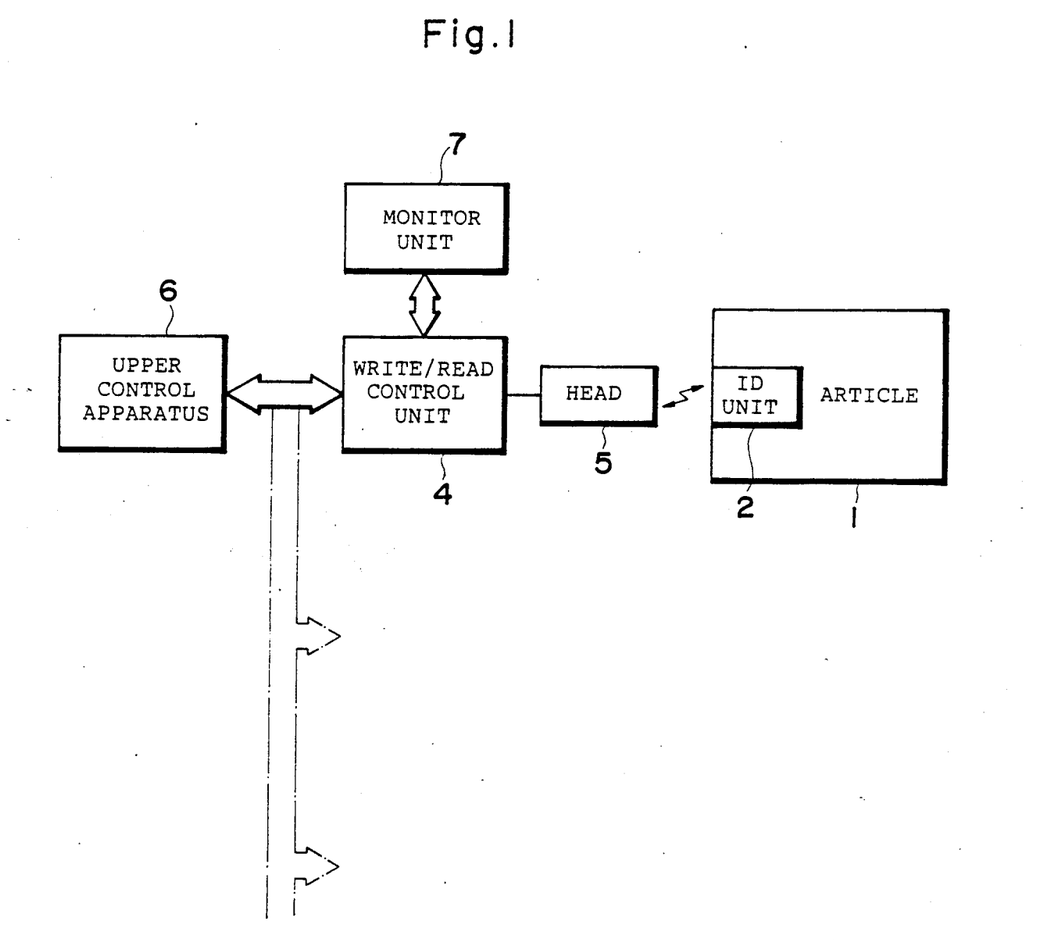
FIG. 1 is a block diagram showing a schematic arrangement of an article recognizing system in an embodiment of the present invention.
Figure 2:
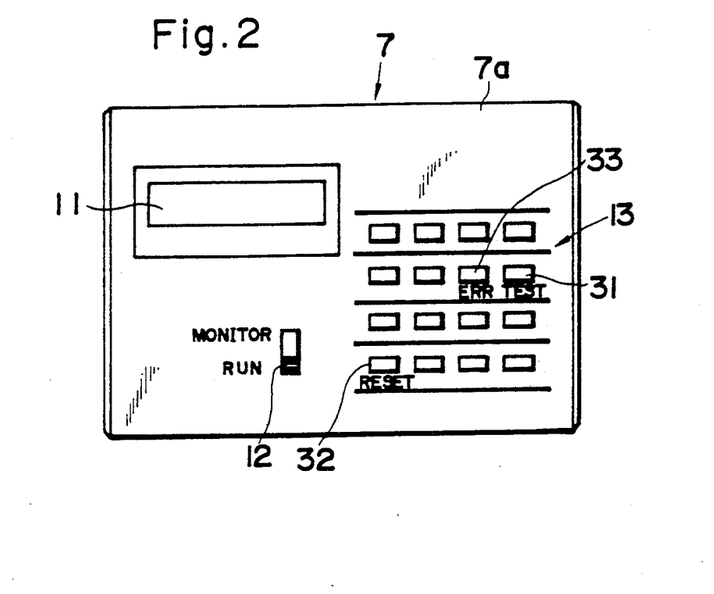
FIG. 2 is a diagram showing an operation panel of a monitor unit in the article recognizing system.
Figure 4:
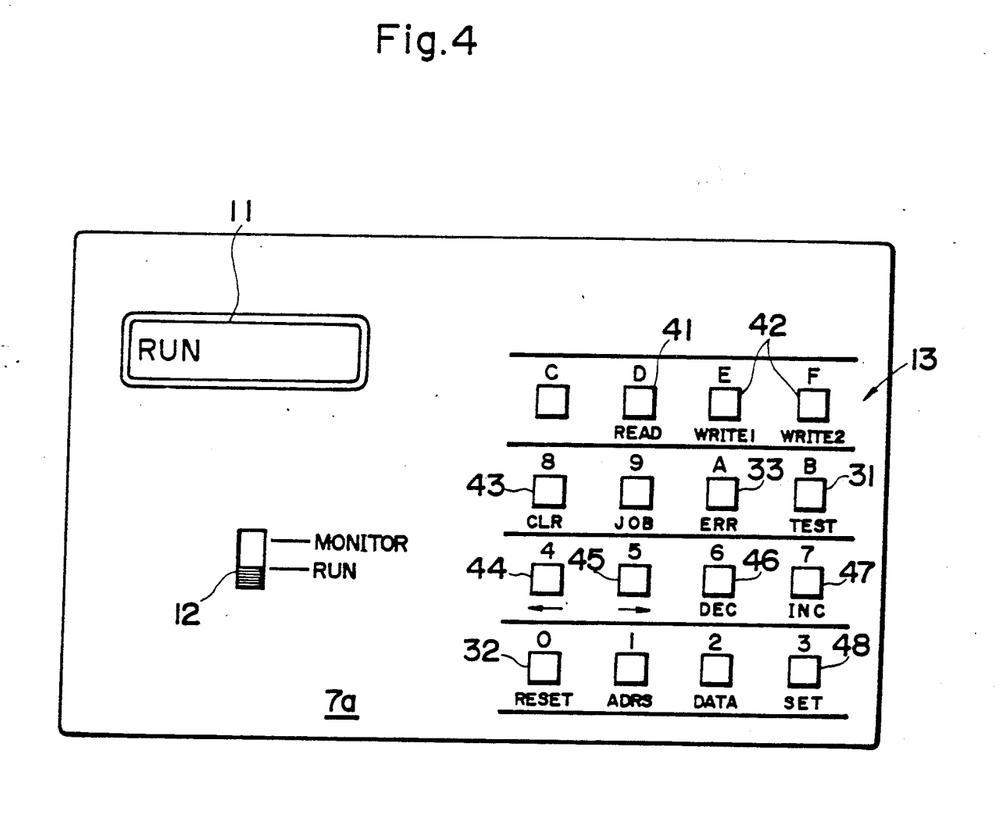
FIG. 4 is an enlarged diagram of the operation panel of the monitor unit.

FIG. 2 shows an operation panel 7a of the monitor unit 7. A display device 11, a mode setting device 12 to switch between the RUN and the MONITOR mode, and a group of keys 13 are provided on the operation panel 7a. To clarify these keys, FIG. 4 shows an enlarged diagram of the operation panel 7a. In addition to a test key 31, a reset key 32, and an error key 33, the group of keys 13 includes the following keys as typical keys: a read key 41, write keys 42, a clear key 43, a key 44 of an arrow in the left direction, a key 45 of an arrow in the right direction, a decrement or decrease (DEC) key 46, an increment increase (INC) key 47, a set key 48, and the like. These function keys are commonly used as keys to input alphabets such as A, B, C, etc. and numerals of 0 to 9. The switching between the function keys and the alphabet/numeral keys is performed by using a predetermined key (for instance, C key).

Figure 3:
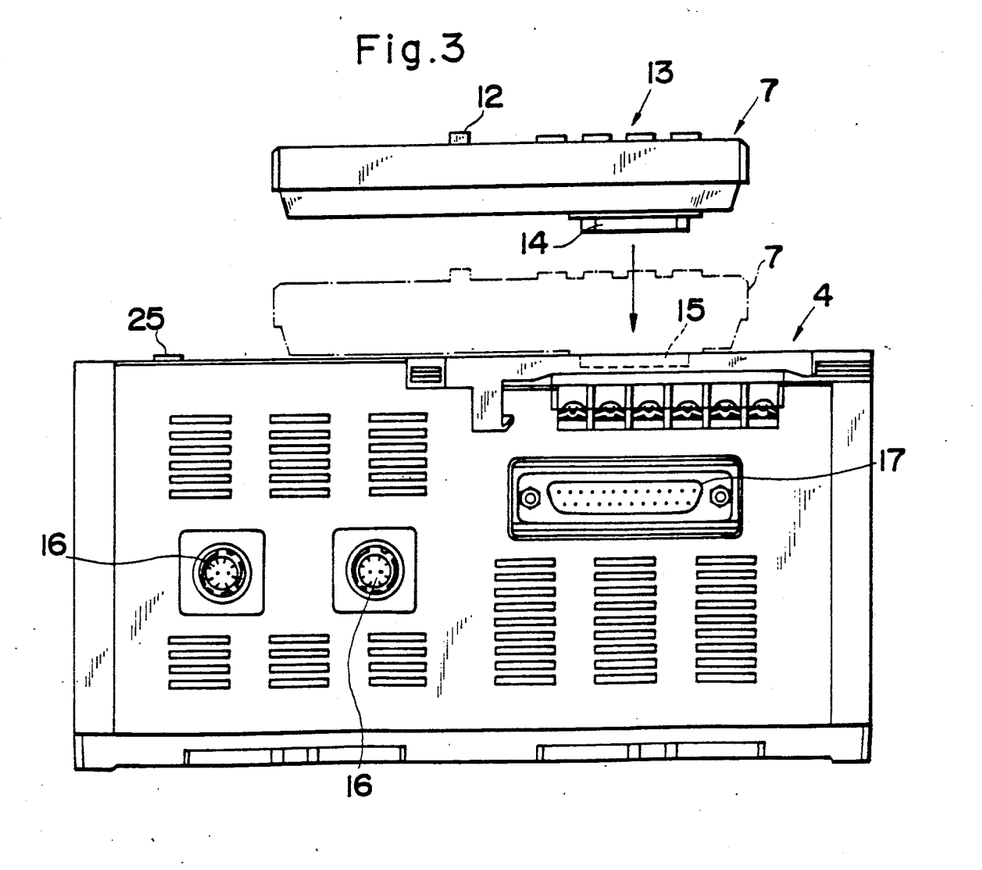
FIG. 3 is a diagram for explaining the attachment of the monitor unit to a write/read control unit.

As shown in FIG. 3, the monitor unit 7 has a connector 14 on the lower surface. The monitor unit 7 is assembled onto the write/read control unit 4 such that the connector 14 is fitted into a connector 15 formed on the upper surface of the write/read control unit 4 and is electrically connected to the connector 15. The control unit 4 further has a connector 16 to connect to the head 5 and a connector 17 to connect to the upper control apparatus 6. An LED 25 to display errors is attached to the upper surface of the write/read control unit 4.

Figure 5:
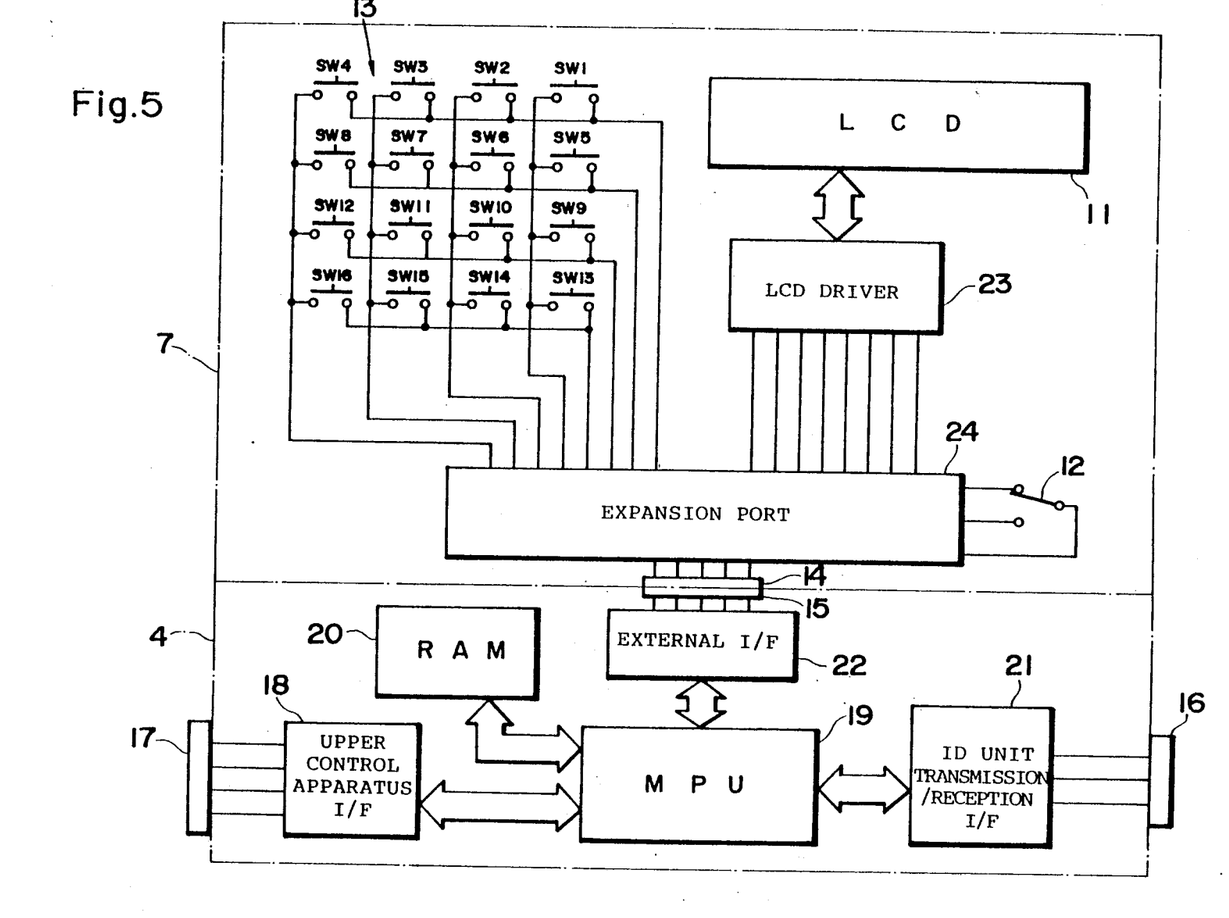
FIG. 5 is a block diagram showing a circuit arrangement of the write/read control unit and monitor unit.

FIG. 5 shows a circuit arrangement diagram of the write/read control unit 4 and the monitor unit 7. The control unit 4 comprises: an interface 18 with the upper control apparatus 6; a MPU (microprocessing unit) 19; a RAM 20; a transmission/reception interface 21 for the ID unit; and an external interface 22 to connect to the monitor unit 7.

The monitor unit 7 comprises: key switches $SW_1$ to $SW_{16}$ which are turned on by depressing the keys of the key group 13; the liquid crystal display device (LCD) 11; the mode setting device (switch) 12; an LCD driver 23; and an expansion port 24.

Figures 6, 7:
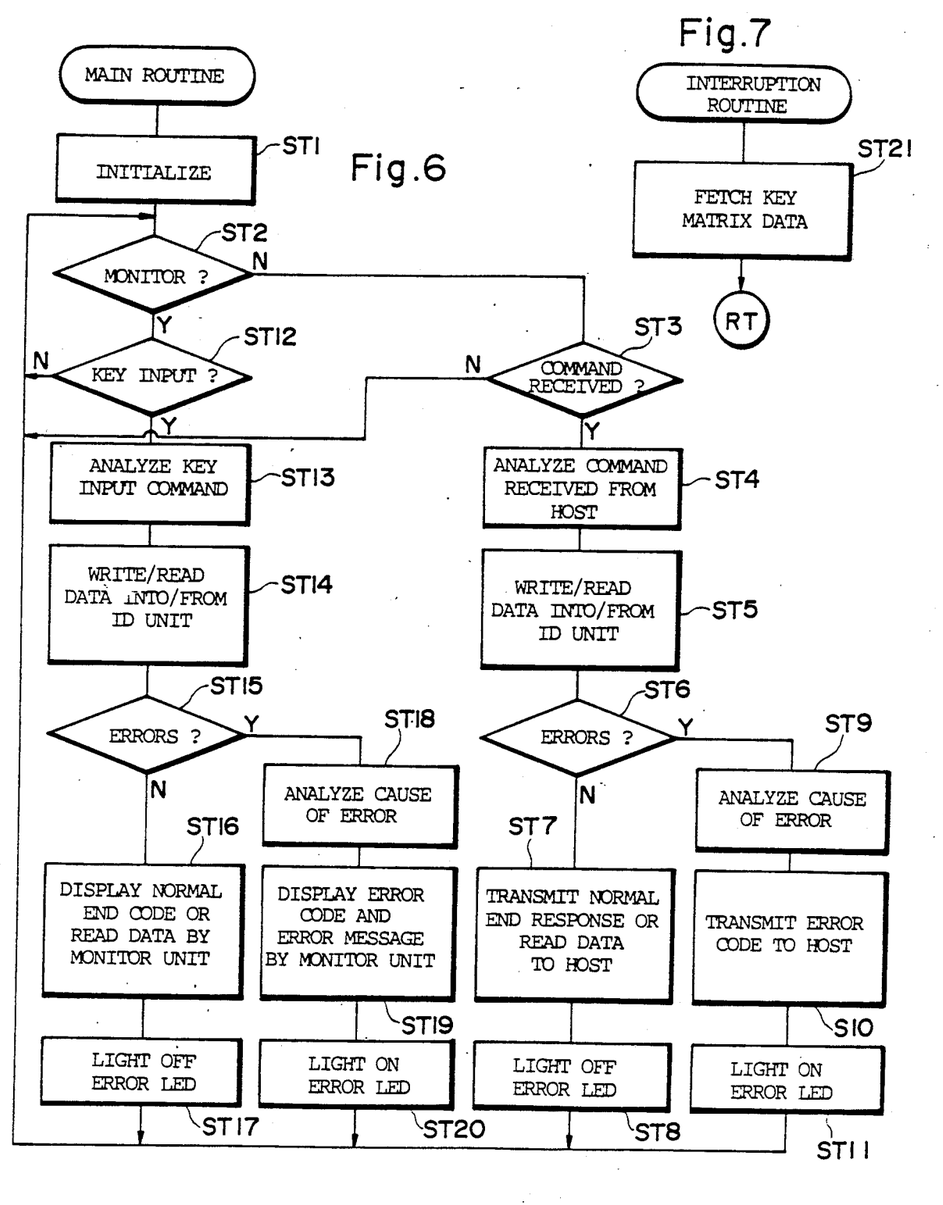
FIGS. 6 and 7 are flowcharts for explaining the operation of the article recognizing system.

The operation of the article recognizing system of the embodiment will now be described with reference to the flowcharts shown in FIGS. 6 and 7. The processes in these flowcharts are executed under the control of the MPU 19.

When a power source is turned on and the operation is started, the initialization is first executed (step 1 (hereinafter, referred to as ST 1)). Next, a check is made to see if the operating mode is in the MONITOR mode (ST 2). Now, assuming that the mode setting device 12 is set to the RUN mode and the write/read control unit 4 is connected to the upper control apparatus 6, the answer in ST 2 is NO, so that ST 3 follows and a check is made to see if command has been sent from the upper control apparatus 6. In this state, "RUN" is displayed on the LCD 11. This display indicates that the write/read control unit 4 is in the online state with the upper control apparatus 6. In this case, even if one of the group of keys 13 of the monitor unit 7 is operated, nothing is received.

When a command from the upper control apparatus 6 is received, the answer in ST 3 is YES, so that the received command is analyzed (ST 4). In response to this command, data is written into or read out from the ID unit 2 through the head 5 (ST 5). After completion of the process in ST 5, a check is made to see if any error has been generated in the process (ST 6). If no error occurs, a normal end response or read data is transmitted to the upper control apparatus 6 through the interface 18(ST 7). Then, the error LED 25 is lit off, and the processing routine is returned to ST 2. The presence or absence of errors is discriminated by reading out the data written in the ID unit 2 and comparing with the write data in the case of the writing mode. On the contrary, in the case of the reading mode, this discrimination is executed by reading out the data twice from the same address in the ID unit 2 and comparing them.

If any error has occurred in ST 6, the cause of the error is analyzed (ST 9). An error code indicative of the cause of the error is transmitted to the upper control apparatus 6 (ST 10). The error LED 25 is lit on (ST 11). Then, the processing routine is returned to ST 2.

By switching the mode setting device 12 to the MONITOR mode, the worker in the field where the head 5 is located can write arbitrary data into an arbitrary address in the memory in the ID unit 2 or can read out data from an arbitrary address by operating the group of keys 13 of the monitor unit 7.

When the mode setting device 12 is set to the MONITOR mode, the answer in ST 2 is YES and a check is then made to see if key input data exists (ST 12), thereby allowing the system to wait until either one of the keys 13 of the monitor unit 7 is operated. In this state, "MONITOR" is displayed on the LCD 11. This display content means that the group of keys 13 can be subsequently operated. If some of the keys are operated, an interrupting process shown in FIG. 7 is started, and the key matrix data of the keys operated are fetched (ST 21).

It is now presumed in the case where data is read out of the memory of the ID unit 2. When the first address to be read out is input by using the address (ADRS) key and numeral keys, "a1F" is displayed on the LCD 11. "a1F" indicates an address. When the operator operates the READ key 41 to execute the reading operation, the answer in ST 12 is YES, so that the key input command is analyzed (ST 13). In this case, since it is presumed that the READ key 41 is operated, "RDa1F" is displayed on the LCD 11. RD denotes a read command, and a1F represents the address.

By operating the REAd key 41, the reading operation is executed for the ID unit 2 (ST 14). After the reading operation was correctly completed, the answer in ST 15 to check the occurrence of errors becomes NO. Therefore, a normal end code or read data is displayed on the LCD 11 of the monitor unit 7 (ST 16). In this case, "RDa1Fd30" is displayed on the LCD 11. "d30" denotes the read data. The read data is displayed, and the error LED 25 is lit off (ST 17). The processing routine is then returned to ST 2.

If errors occured in ST 15, the cause of the errors is analyzed (ST 18), and an error code and an error message are displayed on the LCD 11 of the monitor unit 7 (ST 19).

For instance, "RDa1FE72" is displayed on the LCD 11 in this case. E72 indicates an error code. On the other hand, the error message "DC NOT" can be alternately displayed by shifting the display content by using the key 44 or 45. The error is displayed, and the error LED 25 is also lit on (ST 20). Then, the processing routine is returned to ST 2.

In the case of writing data into the ID unit 2, the address and data to be first written are input by using the address (ADRS) key, data (DATA) key and numeral keys, so that "a1Fd20" is displayed on the LCD 11. "d20" indicates data to be written.

Next, when the operator operates the WRITE key 42 to execute the writing operation, the answer in ST 12 becomes YES, so that the key input command is analyzed (ST 13). For the address in the ID unit 2, "SWa1F" is displayed in the writing operation. "SW" denotes a step write command. The display of the data is cleared. After the writing operation was correctly completed, "SWalFd20" is displayed, and the data content written is again displayed.

If the writing operation was incorrectly finished, for instance, "SWalFE72" is displayed on the LCD 11. By pressing the key 44 or 45, e.g. the error message "DC NOT" is displayed. That is, the error code and error message can be alternately displayed.

Figure 8:
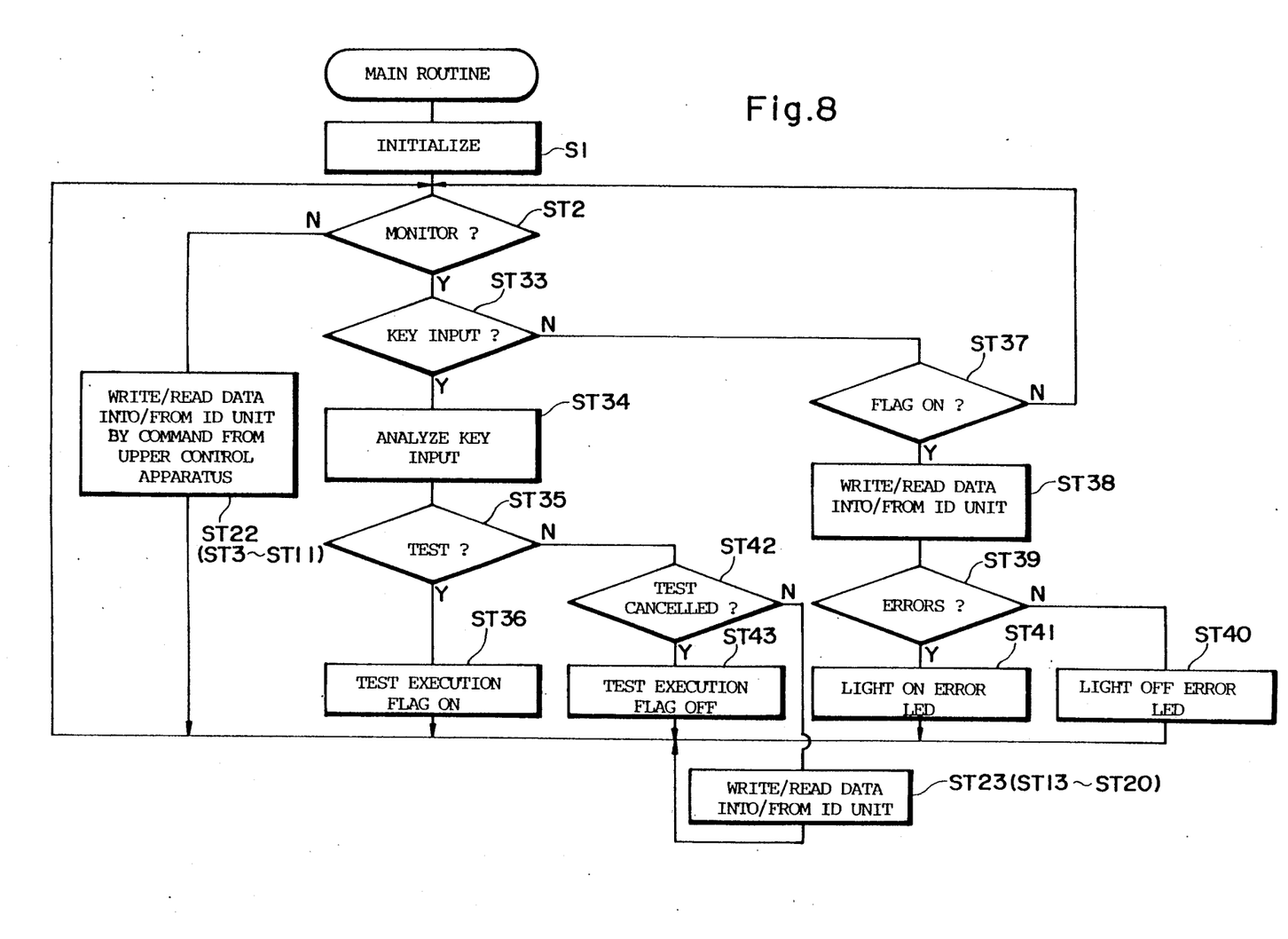
FIG. 8 is a flowchart for explaining the operation of the article recognizing system in another embodiment.

An embodiment in which the processes in the test mode can be performed will now be described. In this embodiment, the arrangement shown in FIGS. 1 to 5, and the processes in FIG. 7 are applied. The operation of this embodiment, particularly, the processing procedure by the MPU 19 is shown in FIG. 8. In this diagram, the same processes as those shown in FIG. 6 are designated by the same step numbers.

When the power supply is turned on and the operation is started, the initialization is first executed (ST 1). Next, a check is made to see if the operating mode has been set to the MONITOR mode (ST 2). If the RUN mode has been set, ST 22 follows and data is written into or read out from the ID unit 2 on the basis of the command from the upper control apparatus 6. These processes are the same as those shown in ST 3 to ST 11 in FIG. 6.

When the operator sets the MONITOR mode by the mode setting device 12, the answer in ST 2 is YES, so that a check is then made to see if key input data exists (ST 33). As described in FIG. 7, if any one of the keys is operated, the processing routine is interrupted, and the key matrix data of the operated key is fetched (ST 21). If the fetched key data exists, the answer in ST 33 is YES, and the key input data is analyzed (ST 34). Further, a check is made to see if the operated key is the TEST key 31 (ST 35) or RESET key 32 (ST 42). The TEST mode is set by the TEST key 31 and reset (test cancelled) by the RESET key 32. If none of the keys 31 and 32 is not depressed, this means that the process other than the test process has been set, so that data is written into or read out from the ID unit 2 by using the monitor unit 7 (ST 23). This process corresponds to those shown in ST 13 to ST 20 in FIG. 6.

When the operator presses the TEST key 31 to adjust the distance between the head 5 and the ID unit 2, the answer in ST 35 becomes YES, and a flag indicating that the test is being executed is set to 1 (ST 36). At this time, "TEST 1-4" is displayed on the LCD 11. In this display, 1-4 denotes the kind of test. Namely,
1: read
2: write
3: auto-read
4: auto-write
Either one of these kinds of test is designated by pressing a numeral key among the group of keys 13.

Thereafter, the test of the designated kind is started. That is, if No in ST 33, a check is made to see if the test is being executed (ST 37). In this case, since the flag indicating that the test is being executed has already been set to 1, the answer in ST 37 is YES. Next, the reading or writing operation for the ID unit 2 is performed. For example, if No. 1 (read) is selected as the kind of test, the reading process is executed (ST 38). In this case, "TRD■" is displayed. "TRD" denotes a test command (read), and "■" indicates that the test is being executed. The lower three digits are provided for error display.

After the reading operation or the like was executed in ST 38, a check is made to see if errors have been generated in this process (ST 39). The generation of errors is determined by reading the data in the same address twice and comparing them in the case of. e.g. the reading process. In the case of the writing process, the written data is again read out and compared with the data before writing. If no error is generated, the error LED 25 is lit off (ST 40). If any error occurred, the error LED 25 is lit on (ST 41) and, for instance, "TRD■9E72" is displayed on the LCD11. In this way, after the test key 31 was operated, the command process to read, write, or the like and the discrimination of the generation of errors are repeated every second. When the above processes are executed while changing the distance between the head 5 and the ID unit 2, the writing/reading operation is correctly executed at the proper distance and no error occurs, where the error LED 25 is not lit on and the error indication is not displayed on the LCD 11. However, when the distance is improper, the writing/reading operation is not correctly performed, and if errors occurred, the error LED 25 is lit on, and the error indication is displayed on the LCD 11. Therefore, the optimum distance can be set by only moving the ID unit 2 while monitoring the error indication.

After completion of the test, the RESET key 32 is operated. Thus, the answer in ST 33 is YES, the answer in ST 35 is NO, and the answer in ST 42 to cancel the TEST mode is YES, so that the flag indicating that the test is being executed is set to 0 (ST 43).

In the embodiment, although the error LED 25 has been provided in the write/read control unit 4, it can be also provided for the head 5.

On the other hand, in the embodiment, the switching between the RUN mode and the MONITOR mode has been made by the mode setting device. However, when the monitor unit 7 is attached and connected to the write/read control unit 4, the operating mode may be forcibly set to the MONITOR mode.

In the embodiment, one write/read control unit 4 has been connected to the upper control apparatus 6. However, the invention can be also applied to the case where a plurality of write/read control units 4 are provided and connected to the upper control apparatus 6.

An ambodiment which is particularly effective to the case where a plurality of write/read control units 4 are provided will now be described in detail. As shown by a broken line in FIG. 1, a plurality of write/read control units 4 are connected to the upper control apparatus 6 through a bus or data transmission line. A different ID No. is assigned to each write/read control unit 4. One or more heads 5 is provided for each write/read control unti 4, and the monitor unit 7 can be attachably and detachably connected to the control unit 4. The arrangement and constitution shown in FIGS. 1 to 5 can be also applied to this embodiment.

The RAM 20 in the write/read control unit 4 includes a non-volatile memory area. Errors which are generated when data is written into or read out from the ID unit 2 are encoded every kind, and the thirty error data are sequentially stored into this memory area in accordance with the order from the new data. The MPU 19 in the control unit 4 has functions to calculate the total number of occurrence times of the respective errors, the total number of all errors occurred, and the generating ratio of errors and to store the calculated values into the memory, i.e. RAM 20.

Figure 9:
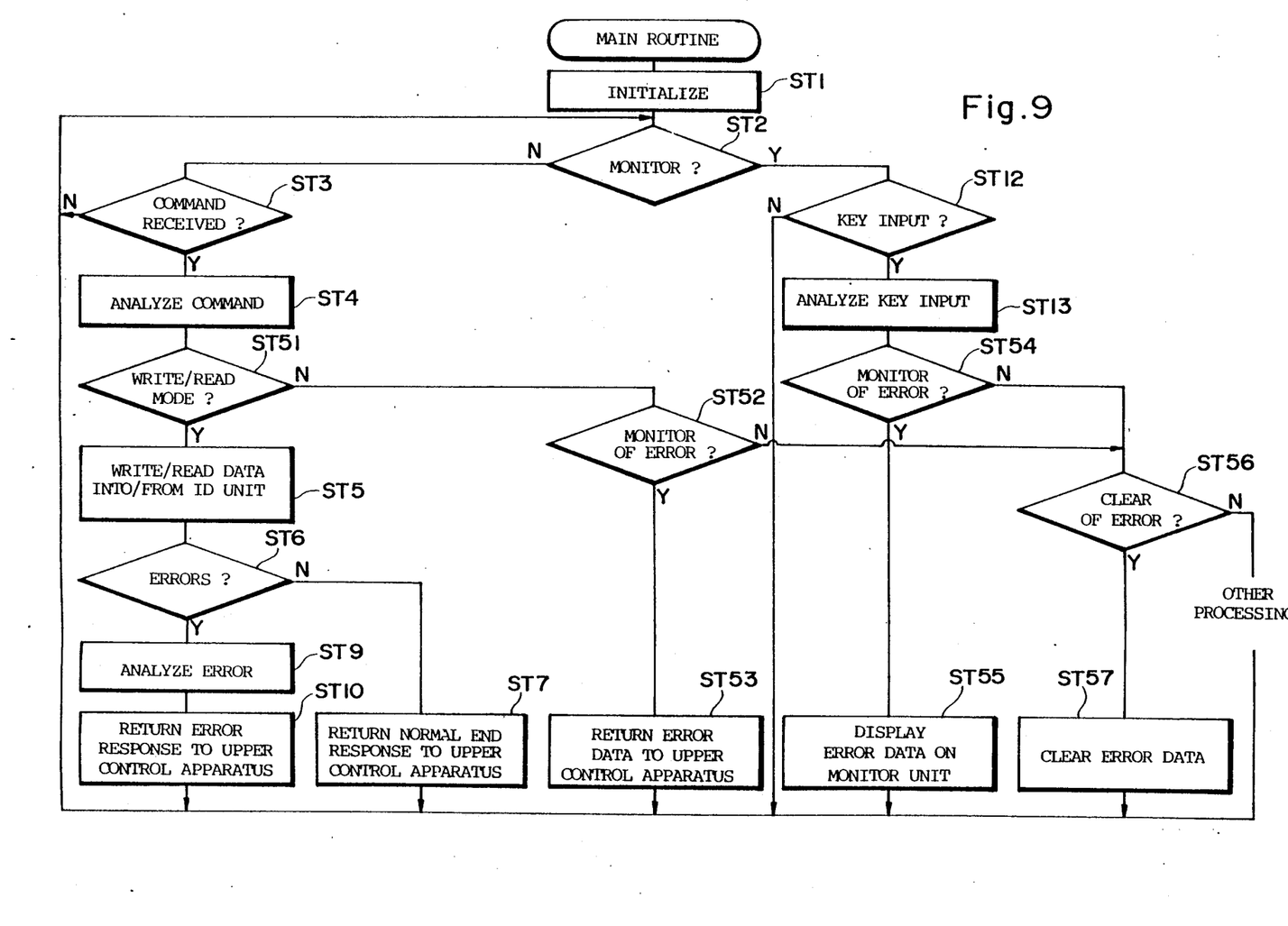
FIG. 9 is a flowchart for explaining the operation of an article recognizing system in another embodiment.

The operation of the article recognizing system in the embodiment will now be described with reference to flowcharts shown in FIGS. 7 and 9. In these diagrams, the same or similar processes as those shown in FIGS. 6 and 8 are designated by the same reference numerals.

When the power supply is turned on and the operation is started, the initialization is executed (ST 1). Then, a check is made to see if the mode setting device 12 has been set to the RUN mode or the MONITOR mode (ST 2). It is now assumed that the mode setting device 12 is set to the RUN mode and the write/read control unit 4 is connected to the upper control apparatus 6. In this case, the processing routine advances to ST 3 and a check is made to see if a command from the upper control apparatus 6 has been received. If the self No. has been designated from the upper control apparatus 6 and a command to write or read out data into/from the ID unit 2 is sent, the answer in ST 3 is YES. The received command is analyzed (ST 4). A check is then made to see if this command indicates the writing or reading operation for the ID unit 2 (ST 51). In the case of the ordinary writing or reading process as shown in the foregoing embodiment, data is written into or read out from the ID unit 2 in correspondence to the command (ST 5). Each time the writing or reading operation is finished, a check is made to see if errors occurred (ST 6). If any error occurred, the error data is processed (ST 9). That is, the error is encoded by every kind of error and stored in the RAM 20. An error response is returned to the upper control apparatus (ST 10). On the contrary, if no error occurs in ST 6, a normal end response indicating that the writing or reading operation has correctly been finished is returned to the upper control apparatus 6 (ST 7). The operation of the error LED 25 is omitted here.

As the result of the analysis of the command in ST 51, if the command does not indicate the writing/reading operation for the ID unit, ST 52 follows, and a check is made to see if the error data is monitored. If the command from the upper control apparatus 6 indicates to monitor the error data, the error data stored in the memory 20 in the write/read control unit 4 are sequentially returned to the upper control apparatus 6 in response to this command (ST 53). Thus, the upper control apparatus 6 can collect the error data stored in the write/read control unit 4.

If the command indicates none of the writing/reading operations for the ID unit 2 and the error data monitor, ST 56 follows to see if the command represents to clear the error data. If the command indicates that the error data is cleared, the error data stored until now in the RAM 20 in the control unit 4 are all cleared (ST 57). Then, the processing routine is returned to ST 2.

Next, in the case of monitoring the error data by the monitor unit 7, the mode setting device 12 is set to the MONITOR mode. Thus, the answer in ST 2 is YES, and ST 12 follows to see if the key input data exists. The discrimination regarding the presence or absence of the key input data is performed by the interrupting process shown in FIG. 7. The kind of key operated is decided by the data fetched by the interrupting process (ST 13). If the operated key is not the error (ERR) key 33, the answer in ST 54 is NO. Then, a check is made to see if the operated key is the clear (CLR) key 43 (ST 56). However, if the operated key is not the clear key 43, the answer in ST 56 is NO. In this case, the writing/reading operation of data into/from the ID unit 2, test mode process or the like is executed as mentioned in the above embodiment. Thereafter, the processing routine is returned to ST 2. The error data generated in the writing/reading operation are also stored into the RAM 20.

As the result of the analysis of the key input data, if the operated key is the error key 33, the answer in ST 54 is YES. Thus, the error data stored in the RAM 20 in the write/read control unit 4 are successively read out and sequentially displayed on the LCD 11 of the monitor unit 7. Thus, the operator can know which kind of error data occurred in the write/read control unit 4 in the past. In the case where the error data are monitored for a certain period of time and the error data obtained so far are cleared, the operator needs to press the clear key 43. Therefore, the answer in ST 56 is YES, and the error data stored so far in the RAM 20 in the control unit 4 are cleared (ST 57).

An explanation will now be made with respect to an example of the display in the case of monitoring the error data in the monitor unit 7.

When the operator presses the error (ERR) key 33 in the MONITOR mode, "ERROR1-4" is displayed on the LCD 11.

This display content indicates that the selection of the contents from error status 1 to 4 should be made. If the numeral 1 is designated by a numeral key of the keys 13, the newest error data (among thirty errors) is designated. When the numeral 2 is designated, the statistic error data is designated. When the numeral 3 is designated, the newest error data is cleared. When the numeral 4 is designated, the statistic error data is cleared. When the RESET key 32 is operated, the stop of the display of the error data is indicated. When the operator inputs the numeral key 1 subsequent to the ERR key 33, that is, when the operator designates to monitor the newest error data, "N01RD110" is displayed on the LCD 11. N01 indicates the error generating order No. The number of generating order of the newest error data assumes "01", and that of the oldest error data assumes "30". On the other hand, RD represents an error generation command and "1" indicates the transmission path No. and "10" represents the error code No. The error code display and the error message display can be alternately switched by the key 44 or 45. The error message "H.PARITY" is displayed by operating the key 44 or 45 for the example of the error mentioned above. By again operating the key 44 or 45, the original display content "N01RD110" can be displayed. Further, by operating the INC key 47 to display the error data of the next order, for instance, "N02RD170" is displayed. To again display the original data, by pressing the DEC key 46, "N01RD110" is displayed. By operating the INC key 47 or DEC key 46, the error data can be arbitrarily shifted forward or backward.

In the case of the statistic error data, "87-09-30" is displayed. In this case, the year, month and day of the date to start to obtain the statistic error data are displayed. When the INC key 47 is pressed, the next content is displayed and, e.g. "SZZ9 110" is displayed. ZZ9 indicates the number of occurrance times of the errors. "1" in the third digit indicates the transmission path No. and "10" represents the error code. By pressing the key 44 or 45, the error message corresponding to the eror code displayed at present is displayed. On the other hand, by pressing the INC key 47, the next statistic errors are sequentially displayed in accordance with the order of the error codes. Similarly, by pressing the DEC key 46, the statistic errors can be sequentially reversely displayed. After all of the statistic errors were displayed, the display is further advanced and the MCBF by the calculation of the following equations is displayed.

$$MCBF = \frac{\text{total number of higher commands}}{\text{total number of higher and lower transmission errors}}$$

Next, in the case of clearing the newest error data, "CLEAR N?" is displayed and the execution of the clearing operation is confirmed. In this case, by pressing the SET key 48, the clearing operation is performed. At this time, by pressing the RESET key 32, the clearing operation can be also stopped. In the case of clearing the statistic error date, "CLEAR S?" is displayed to confirm the execution of the clearing operation. When the operator operates the SET key 48, the clearing operation is executed.

What is claimed is:

1. An article recognizing system comprising:
   an ID unit, attached to an article to be recognized, for storing article identification data;
   a head for writing and reading predetermined data to and from said ID unit in a contactless manner;
   a write/read control unit for controlling writing and reading operations of the data into and from the ID unit through said head in accordance with a command from an upper control apparatus;
   a monitor unit having a group of keys and a display device and means for connecting said monitor unit to said write/read control unit wherein said monitor unit has a mode setting device for selecting one of a run mode and a monitor mode and a key input apparatus for inputting commands and data relating to the writing and reading operations for the ID unit;
   and wherein said write/read control unit has means for controlling data writing and reading operations into and from the ID unit, said means being responsive to a command from said upper control apparatus in the run mode and responsive to an input command from said key input apparatus in the monitor mode.

2. An article recognizing system comprising:
   an ID unit, attached to an article to be recognized, for storing article identification data;
   a head for writing and reading predetermined data to and from said ID unit in a contactless manner;
   a write/read control unit for controlling writing and reading operations of the data to and from the ID unit through said head in accordance with a command from an upper control apparatus;
   a monitor unit having a group of keys and a display device and means for connecting said monitor unit to said write/read control unit, wherein said monitor unit has a key input apparatus including a key for designating a test mode and keys for inputting commands relating to the writing and reading operations for the ID unit,
   and wherein said write/read control unit has control means to continuously execute the writing/reading operations for the ID unit in response to the designation of the test mode in said monitor unit, and means for discriminating whether each of the writing/reading operations has correctly been performed and for allowing results of the discrimination to be displayed on said display device.

3. An article recognizing system comprising:
   an ID unit, attached to an article to be recognized, for storing article identification data;
   a head for writing and reading predetermined data to and from said ID unit in a contactless manner;
   a write/read control unit for controlling writing and reading operations of the data to and from the ID unit through said head in accordance with a command from an upper control apparatus; and
   a monitor unit having a group of keys and a display device and means for connecting said monitor unit to said write/read control unit,
   wherein said write/read control unit has means for discriminating if errors have been generated in the writing and reading operations of data to and from the ID unit and memory means for sequentially storing errors discriminated,
   and wherein, when a display command is given by one of said group of keys in said monitor unit, error data in said memory means is displayed on said display device.

4. An article recognizing system comprising a head for performing transmission and reception of data in a contactless manner for an ID unit storing article identification data and a write/read control unit for controlling data transmission and reception through said head in accordance with commands from an upper control apparatus,
   wherein the write/read control unit has a monitor unit provided with a mode setting device to select one of a run mode and a monitor mode, a group of keys to input commands related to the data transmission and reception for said ID unit, and a display device, and
   wherein the write/read control unit responds to a command from said upper control apparatus when the run mode is selected, and the write/read control unit responds to a key input from said monitor unit when the monitor mode is selected.

5. An article recognizing system comprising a head to perform transmission and reception of data in a contactless manner for an ID unit storing article identification data, and a write/read control unit to control data transmission and reception through said head in accordance with commands from an upper control apparatus,
   wherein said write/read control unit has a monitor unit having a group of keys including a key to designate a test mode and keys to input commands relating to the data transmission and reception for said ID unit, and a display device, and
   said write/read control unit has means for reading a key input signal from said monitor unit, means for continuously executing writing/reading operations for the ID unit in response to the designation of the test mode, and means for discriminating if each of the writing/reading operations has correctly been executed, and a result of the discrimination is displayed on said display device of said monitor unit.

6. An article recognizing system comprising a head to perform transmission and reception of data in a contactless manner for an ID unit storing article identification data, and a write/read control unit to control the data transmission and reception through said head in accordance with commands from an upper control apparatus,
   wherein said write/read control unit has means for discriminating whether errors have been generated during data transmission and reception, error data memory means for sequentially storing errors discriminated by said discriminating means, and monitor means for outputting error data.

7. The system recited in claim 6 wherein the error data memory means sotres an indication of error status for each of a plurality of distances between the ID unit and the head.

* * * * *